(12) United States Patent
Ota et al.

(10) Patent No.: US 8,610,763 B2
(45) Date of Patent: Dec. 17, 2013

(54) DISPLAY CONTROLLER, DISPLAY CONTROL METHOD, PROGRAM, OUTPUT DEVICE, AND TRANSMITTER

(75) Inventors: Masashi Ota, Tokyo (JP); Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 12/907,339

(22) Filed: Oct. 19, 2010

(65) Prior Publication Data

US 2011/0109732 A1    May 12, 2011

(30) Foreign Application Priority Data

Nov. 6, 2009   (JP) ................................. 2009-254958

(51) Int. Cl.
*H04N 13/04*     (2006.01)
*H04N 13/00*     (2006.01)
*H04N 13/02*     (2006.01)

(52) U.S. Cl.
USPC ............... 348/54; 348/42; 348/51; 348/53; 348/56

(58) Field of Classification Search
USPC .................................. 348/42, 51, 53, 54, 56
See application file for complete search history.

(56) References Cited

U.S. PATENT DOCUMENTS

| | | | |
|---|---|---|---|
| 6,285,368 B1 * | 9/2001 | Sudo | 345/419 |
| 6,614,927 B1 * | 9/2003 | Tabata | 382/154 |
| 2004/0004616 A1 * | 1/2004 | Konya et al. | 345/419 |
| 2005/0041156 A1 * | 2/2005 | Kondo et al. | 348/700 |
| 2005/0089212 A1 * | 4/2005 | Mashitani et al. | 382/154 |
| 2006/0181767 A1 | 8/2006 | Hanzawa | |
| 2007/0025703 A1 * | 2/2007 | Horie | 386/96 |
| 2007/0263003 A1 * | 11/2007 | Ko et al. | 345/502 |
| 2007/0285574 A1 * | 12/2007 | Nobori | 348/581 |
| 2010/0150523 A1 * | 6/2010 | Okubo et al. | 386/68 |

FOREIGN PATENT DOCUMENTS

| | | |
|---|---|---|
| JP | 7-222203 | 8/1995 |
| JP | 2006-208407 | 8/2006 |

OTHER PUBLICATIONS

U.S. Appl. No. 12/894,486, filed Sep. 30, 2010, Ota, et al.

* cited by examiner

*Primary Examiner* — Anner Holder
*Assistant Examiner* — On S Mung
(74) *Attorney, Agent, or Firm* — Oblon, Spivak, McClelland, Maier & Neustadt, L.L.P.

(57) ABSTRACT

A display controller includes an extraction unit for extracting a characteristic of at least one of image data and sound data of content; a detection unit for detecting a predetermined scene of the content on the basis of the characteristic extracted by the extraction unit; a reproduction unit for reproducing the content; and a display control unit for displaying an image of the content so as to be recognized as a two-dimensional image when the reproduction position of the content is a position of a section of the predetermined scene detected by the detection unit and displaying an image of the content so as to be recognized as a three-dimensional image when the reproduction position of the content is a position outside the section of the predetermined scene.

19 Claims, 13 Drawing Sheets

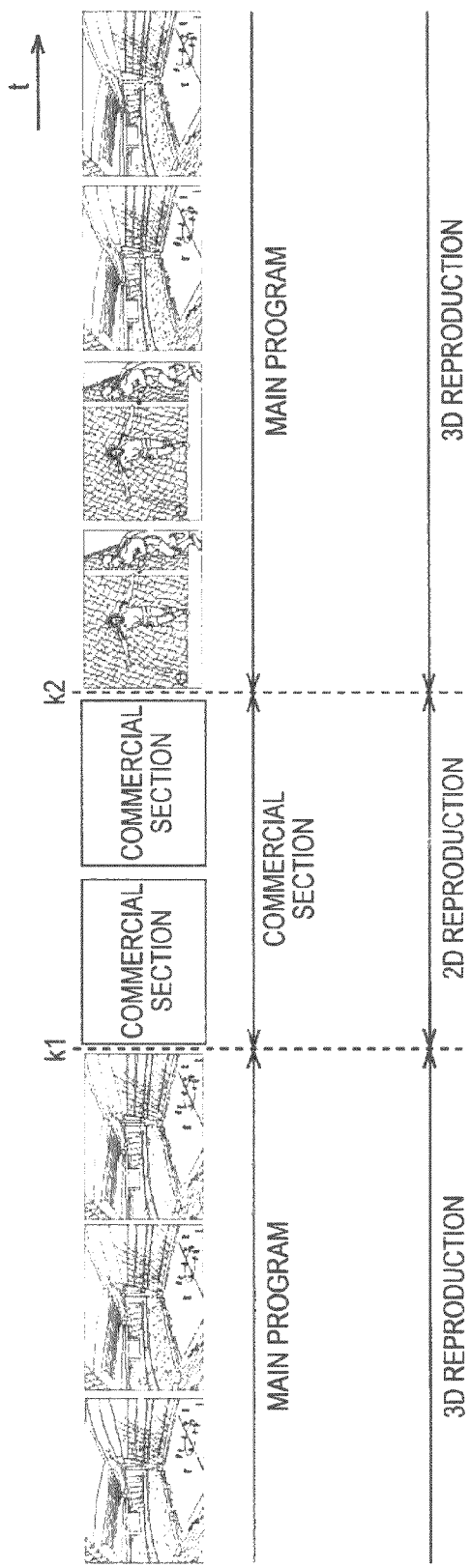

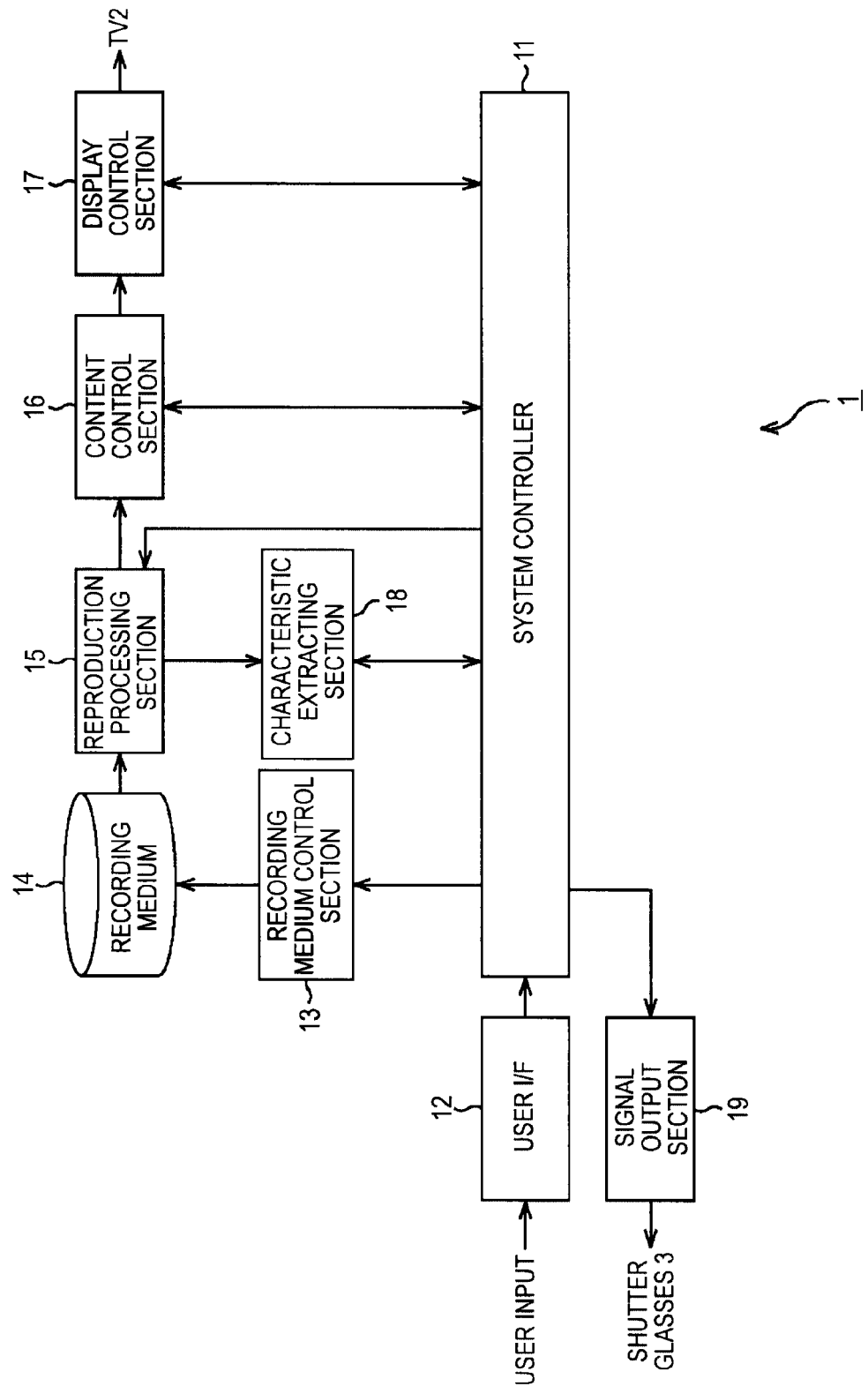

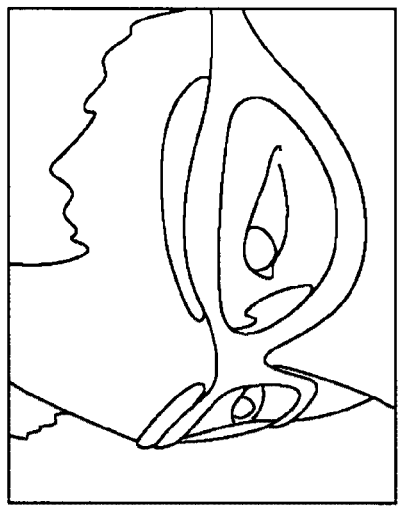
*FIG.4A*
AT THE TIME OF 3D REPRODUCTION
COMMERCIAL SECTION →
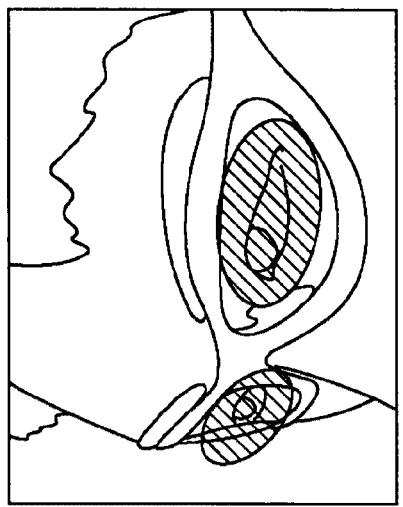
AT THE TIME OF NORMAL REPRODUCTION (OPTICAL CHARACTERISTICS ARE MADE TO BE EQUAL)
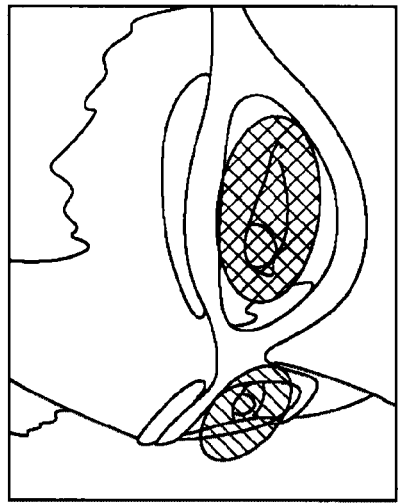
*FIG.4B*
AT THE TIME OF 3D REPRODUCTION
COMMERCIAL SECTION →
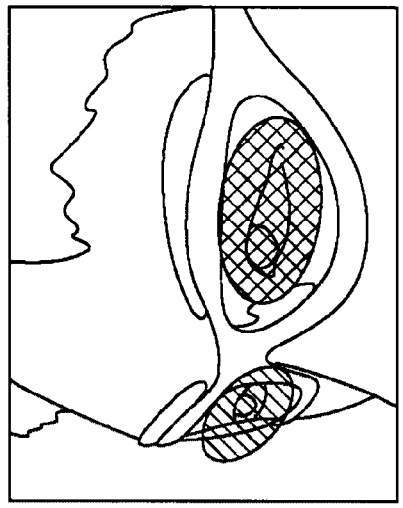
AT THE TIME OF NORMAL REPRODUCTION (COLOR OF GLASSES IS REMOVED)

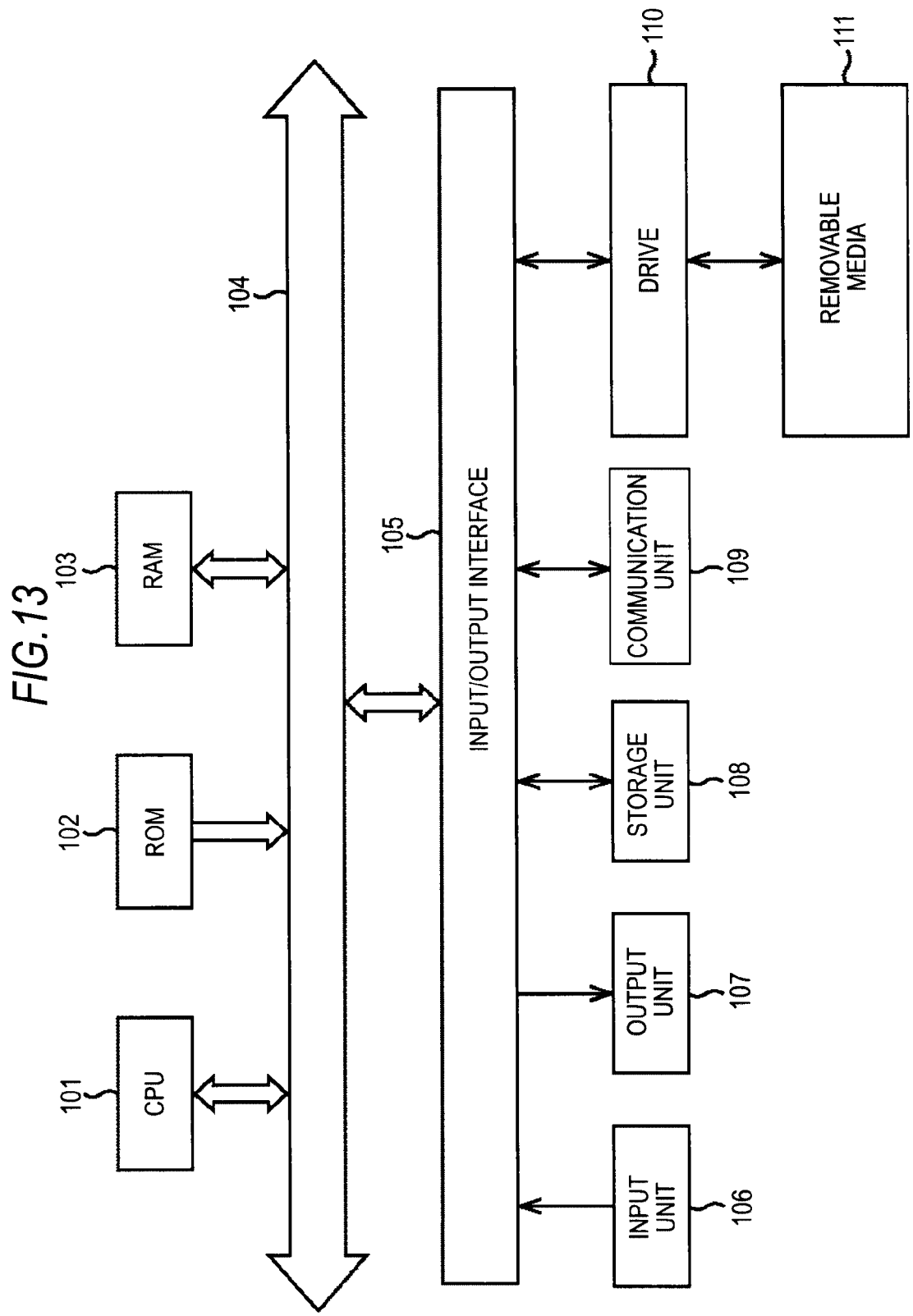

DISPLAY CONTROLLER, DISPLAY CONTROL METHOD, PROGRAM, OUTPUT DEVICE, AND TRANSMITTER

BACKGROUND OF THE INVENTION

1. Field of the Invention

The present invention relates to a display controller, a display control method, a program, an output device, and a transmitter and in particular, to a display controller, a display control method, a program, an output device, and a transmitter which make it possible to watch 3D content effectively while alleviating a feeling of fatigue.

2. Description of the Related Art

In recent years, a 3D (three-dimensional) display method which makes it possible for a viewer to recognize an image stereoscopically has been drawing attention as a display method of an image which became realizable with an improvement in the number of pixels of a display device, such as an LCD (Liquid Crystal Display), or an improvement in the frame rate.

Hereinafter, an image through which a viewer can recognize a subject stereoscopically when seeing it is called a 3D image and content including the data of a 3D image is called 3D content. In addition, reproduction for displaying a 3D image is called 3D reproduction. Reproduction for displaying a normal 2D image (planar image through which it is not possible to recognize a subject stereoscopically) is called 2D reproduction.

Methods of enjoying a 3D image include a glasses method, which uses polarized filter glasses or shutter glasses, and a naked-eye method which does not use glasses, such as a lenticular method. In addition, reproduction methods of displaying a 3D image include a frame sequential method which alternately displays an image for a left eye (L image) and an image for a right eye (R image) with parallax. By sending the image for a left eye and the image for a right eye to the left and right eyes of a viewer, respectively, through shutter glasses or the like, it becomes possible to make the viewer feel a three-dimensional effect.

As realistic expression becomes possible, techniques for such 3D reproduction are being actively developed. Moreover, a technique of displaying a 3D image by generating 3D content on the basis of content (2D content) used for normal 2D reproduction is also under development. There is a technique using parallax of images as a method of generating 3D content from 2D content (for example, JP-A-7-222203).

A 3D image and a 2D image have different image characteristics. Accordingly, if a user watches 3D images for a long time, the user may be more fatigued than when the user watches 2D images. Since the user feels that the 3D image is more realistic than the normal 2D image, there is a possibility that the user will watch the content for a long time without consciously meaning to.

As a result, a feeling of fatigue may increase before the user notices it, compared with the case of watching normal 2D images. For this reason, various techniques of alleviating the feeling of fatigue when watching 3D images have been proposed (for example, JP-A-2006-208407).

SUMMARY OF THE INVENTION

Among recording apparatuses which record the normal 2D content, such as a hard disk recorder commercially available in recent years, there is a recording apparatus in which a mode for reproducing only a specific scene is prepared as a reproduction mode of recorded content.

It is thought that such a reproduction mode can also be used in the case of reproducing 3D content. In this case, it is thought that if only a specific scene is expressed in a 3D display method and other scenes are expressed in a 2D display method, a feeling of fatigue of a user can be alleviated compared with the case where all sections of the content are displayed in the 3D display method.

Moreover, since a 3D image can be expressed more realistically than a 2D image, the user can surely recognize the difference from at the time of watching a 2D image by switching a display method according to a scene. As a result, it is thought that the user can watch the specific scene effectively.

In view of the above, it is desirable to make it possible to watch 3D content effectively while alleviating a feeling of fatigue.

According to a first embodiment of the present invention, there is provided a display controller including: an extraction means for extracting a characteristic of at least one of image data and sound data of the content; a detection means for detecting a predetermined scene of the content on the basis of the characteristic extracted by the extraction means; a reproduction means for reproducing the content; and a display control means for displaying an image of the content so as to be recognized as a two-dimensional image when the reproduction position of the content is a position of a section of the predetermined scene detected by the detection means and displaying an image of the content so as to be recognized as a three-dimensional image when the reproduction position of the content is a position outside the section of the predetermined scene.

It may be possible to further provide a conversion means for converting the input content into content including data of an image for a left eye and data of an image for a right eye with parallax for displaying a three-dimensional image when the content input as an object to be reproduced is content including only image data for displaying a two-dimensional image as image data. In this case, the display control means may display an image of the content outside the section of the predetermined scene on the basis of the content converted by the conversion means and display an image of the content of the predetermined scene on the basis of the input content.

When the content input as an object to be reproduced is content including data of an image for a left eye and data of an image for a right eye with parallax as image data, the display control means may display an image of the content outside the section of the predetermined scene on the basis of the input content and may display an image of the content of the predetermined scene on the basis of either the data of the image for a left eye or the data of the image for a right eye.

The content may be data of a television program, and the section of the predetermined scene may be a commercial section included in the television program.

According to the first embodiment of the present invention, there is also provided a display control method including the steps of: extracting a characteristic of at least one of image data and sound data of the content; detecting a predetermined scene of the content on the basis of the extracted characteristic; reproducing the content; and displaying an image of the content so as to be recognized as a two-dimensional image when the reproduction position of the content is a position of a section of the detected predetermined scene and displaying an image of the content so as to be recognized as a three-dimensional image when the reproduction position of the content is a position outside the section of the predetermined scene.

According to the first embodiment of the present invention, there is also provided a program causing a computer to execute processing including the steps of: extracting a characteristic of at least one of image data and sound data of the content; detecting a predetermined scene of the content on the basis of the extracted characteristic; reproducing the content; and displaying an image of the content so as to be recognized as a two-dimensional image when the reproduction position of the content is a position of a section of the detected predetermined scene and displaying an image of the content so as to be recognized as a three-dimensional image when the reproduction position of the content is a position outside the section of the predetermined scene.

According to a second embodiment of the present invention, there is provided an output device including: an extraction means for extracting a characteristic of at least one of image data and sound data of the content; a detection means for detecting a predetermined scene of the content on the basis of the characteristic extracted by the extraction means; a reproduction means for reproducing the content; and an output means for outputting an image of the content as a two-dimensional image when the reproduction position of the content is a position of a section of the predetermined scene detected by the detection means and outputting an image of the content as a three-dimensional image when the reproduction position of the content is a position outside the section of the predetermined scene.

According to a third embodiment of the present invention, there is provided a transmitter including: an extraction means for extracting a characteristic of at least one of image data and sound data of the content which includes image data for a left eye and image data for a right eye with parallax; a detection means for detecting a predetermined scene of the content on the basis of the characteristic extracted by the extraction means; and a transmission means for transmitting data regarding the detected predetermined scene together with the image data of the content.

According to a fourth embodiment of the present invention, there is provided a display controller including: a receiving means for receiving data of content including at least image data and also receiving data regarding a predetermined scene detected on the basis of a characteristic of at least one of image data and sound data of the content; a reproduction means for reproducing the content; and a display control means for displaying an image of the content so as to be recognized as a two-dimensional image when the reproduction position of the content is a position of a section of the predetermined scene and displaying an image of the content so as to be recognized as a three-dimensional image when the reproduction position of the content is a position outside the section of the predetermined scene.

According to the first embodiment of the present invention, a characteristic of at least one of the image data and the sound data of the content is extracted, and a predetermined scene of the content is detected on the basis of the extracted characteristic. When the reproduction position of the content is a position of a section of the detected predetermined scene, an image of the content is displayed so as to be recognized as a two-dimensional image. When the reproduction position of the content is a position outside the section of the predetermined scene, an image of the content is displayed so as to be recognized as a three-dimensional image.

According to the second embodiment of the present invention, a characteristic of at least one of the image data and the sound data of the content is extracted, and a predetermined scene of the content is detected on the basis of the extracted characteristic. Moreover, the content is reproduced, and an image of the content is output as a two-dimensional image when the reproduction position of the content is a position of a section of the predetermined scene and an image of the content is output as a three-dimensional image when the reproduction position of the content is a position outside the section of the predetermined scene.

According to the third embodiment of the present invention, a characteristic of at least one of image data and sound data of the content, which includes image data for a left eye and image data for a right eye with parallax, is extracted, and a predetermined scene of the content is detected on the basis of the extracted characteristic. Moreover, the data regarding the detected predetermined scene is transmitted together with the image data of the content.

According to the fourth embodiment of the present invention, the data of the content including at least the image data is received and the data regarding the predetermined scene detected on the basis of a characteristic of at least one of the image data and the sound data of the content is also received, and the content is reproduced. When the reproduction position of the content is a position of a section of the predetermined scene, an image of the content is displayed so as to be recognized as a two-dimensional image. When the reproduction position of the content is a position outside the section of the predetermined scene, an image of the content is displayed so as to be recognized as a three-dimensional image.

According to the embodiments of the present invention, it is made possible to watch 3D content effectively while alleviating a feeling of fatigue.

BRIEF DESCRIPTION OF THE DRAWINGS

FIG. 2 is a view showing an example of switching of a reproduction method;

FIG. 3 is a block diagram showing an example of the configuration of a display controller;

FIGS. 4A and 4B are views showing a state of shutter glasses;

FIG. 13 is a block diagram showing an example of the configuration of hardware of a computer.

DESCRIPTION OF THE PREFERRED EMBODIMENTS

3D Image Display System

Figure 1:
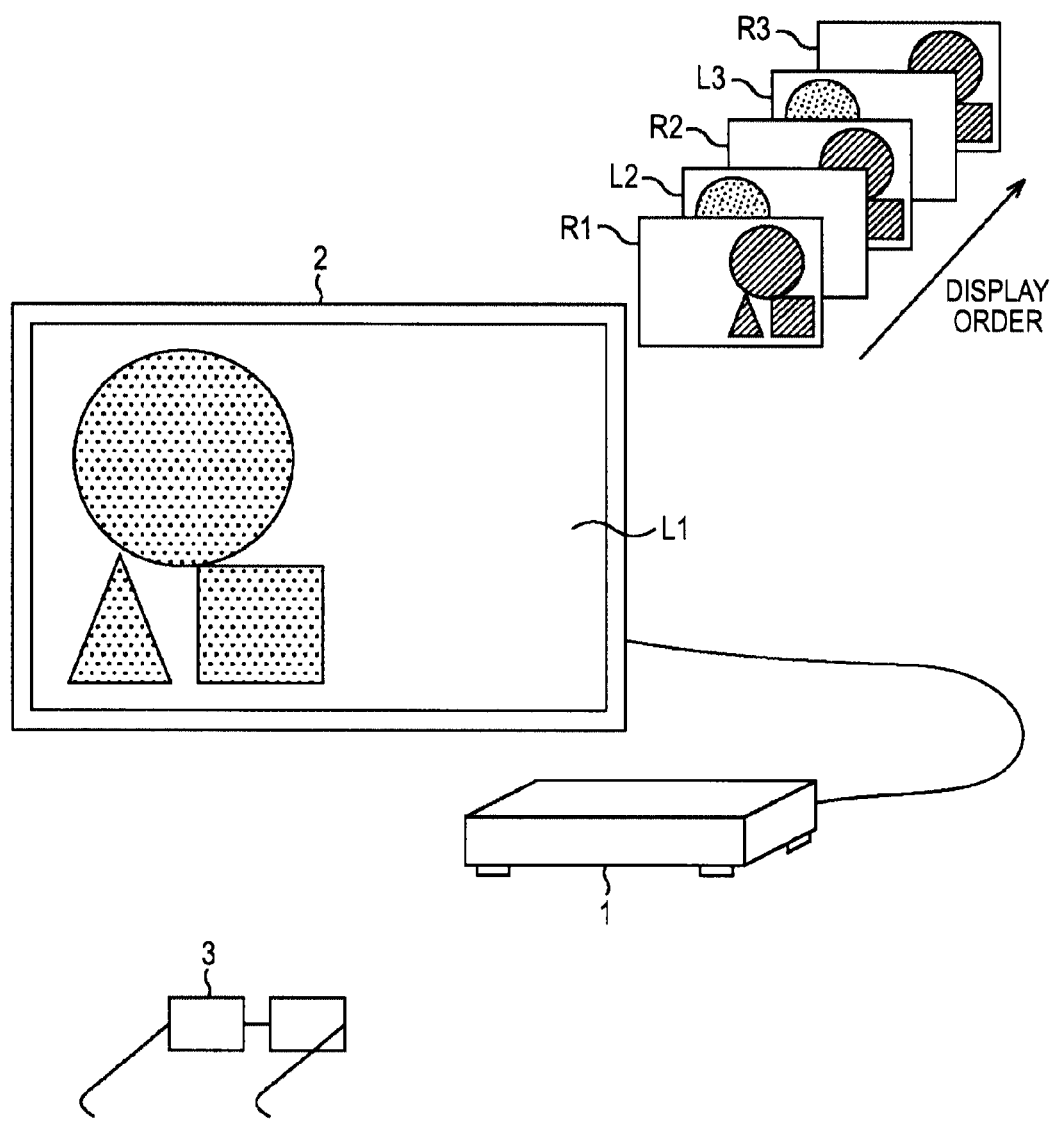
FIG. 1 is a view showing an example of the configuration of a 3D image display system according to an embodiment of the present invention.

FIG. 1 is a view showing an example of the configuration of a 3D image display system according to one embodiment of the present invention.

As shown in FIG. 1, the 3D image display system includes a display controller 1, a TV (television receiver) 2, and shutter glasses 3. That is, a watching method of a 3D image based on the 3D image display system in FIG. 1 is a method using glasses. A user who is a content viewer wears the shutter glasses 3.

The display controller 1 reproduces content, displays an image (moving image) of the content on the TV 2, and outputs the sound of the content from a speaker (not shown). The display controller 1 and the TV 2 are connected to each other, for example, by a cable that meets the HDMI (High Definition Multimedia Interface) specifications.

For example, the display controller 1 reproduces content recorded on a built-in HDD or content recorded on a Blu-ray (trademark) disc inserted in a drive. The content to be reproduced by the display controller 1 is data of a television program and includes image data and sound data. The television program is formed by a main program and a commercial.

Here, the case will be described in which content to be reproduced includes, as image data, data of an image for a left eye and data of an image for a right eye with parallax when two frames, which continue in display order, are compared.

In FIG. 1, an image L1 for a left eye is displayed on the TV 2. Subsequently, as shown in the upper right portion in FIG. 1, an image for a left eye and an image for a right eye, such as an image R1 for a right eye, an image L2 for a left eye, an image R2 for a right eye, an image L3 for a left eye, an image R3 for a right eye, . . . , are alternately displayed.

A control signal including the information on a vertical synchronization signal of an image is supplied from the display controller 1 to the shutter glasses 3 through wireless communication using an infrared ray, for example. A light transmissive section on the left eye side and a light transmissive section on the right eye side of the shutter glasses 3 are formed by a liquid crystal device capable of controlling its polarization characteristic.

The shutter glasses 3 repeat two shutter open and close operations of "left eye open and right eye close" and "left eye close and right eye open" alternately according to a control signal. As a result, only an image for a right eye is input to the user's right eye and only an image for a left eye is input to the left eye. There is parallax between the image for a left eye, and the image for a right eye (there is a difference equivalent to parallax between the display positions of a subject). By viewing the image for a left eye and the image for a right eye with parallax alternately, the user feels an image of the program as a 3D image.

Moreover, the display controller 1 analyzes the image data and the sound data of the content to detect a commercial section included in the program.

When the current reproduction position becomes a position of the commercial section, the display controller 1 changes the image reproduction method from 3D reproduction, which has been adopted until then, to 2D reproduction and displays the image of the commercial section as a 2D image. In addition, the display controller 1 controls the shutter glasses 3 so that the characteristics of the light transmissive section on the left eye side and the light transmissive section on the right eye side become the same characteristics.

When reproduction of the commercial section ends and the current reproduction position becomes a position of a main program section, the display controller 1 returns the image reproduction method from 2D reproduction to 3D reproduction and displays the image of the main program section as a 3D image. Moreover, the display controller 1 controls the shutter glasses 3 again so that an image for a right eye is input to the right eye of the user and an image for a left eye is input to the left eye.

FIG. 2 is a view showing an example of switching of a reproduction method.

In the example shown in FIG. 2, the content to be reproduced is a soccer broadcast, and a section from time k1 to time k2 is detected as a commercial section. A section other than the commercial section is a main program section. As shown in FIG. 2, 2D reproduction is performed in a period of time k1 to time k2, which is the commercial section, and 3D reproduction is performed in the main program section.

By displaying only an image of a main program section of the whole program as a 3D image as described above, it becomes possible to alleviate a feeling of fatigue of the user compared with the case where images of the whole program are displayed as 3D images. The eyes of the user may be in the rest state in the commercial section.

In addition, since it can be emphasized that a section being reproduced is a main program section by displaying an image of the main program section as a 3D image for the user, the user can watch the program effectively.

[Configuration of the Display Controller 1]

FIG. 3 is a block diagram showing an example of the configuration of the display controller 1.

A system controller 11 controls the overall operation of the display controller 1 according to a signal indicating the content of a user operation supplied from a user I/F 12.

For example, the system controller 11 detects a commercial section of a program on the basis of the characteristic data supplied from a characteristic extracting section 18. During reproduction of the content, the system controller 11 controls each section on the basis of the detection result so that 3D reproduction is performed in the main program section and 2D reproduction is performed in the commercial section.

The user I/F 12 is formed by a light receiving section which receives a signal from a remote controller. The user I/F 12 detects a user operation on a remote controller and outputs a signal indicating the content to the system controller 11.

A recording medium control section 13 controls recording of the content into a recording medium 14 or reading of the content from the recording medium 14. The recording medium 14 is a HDD (Hard Disk Drive) and records the content.

In addition, the recording medium control section 13 receives the broadcast content (3D content) on the basis of a signal from an antenna (not shown) and records it on the recording medium 14. When the predetermined content is selected from the content recorded on the recording medium 14 by the user and reproduction of the selected content is instructed, the recording medium control section 13 supplies the content, reproduction of which has been instructed, from the recording medium 14 to a reproduction processing section 15.

The reproduction processing section 15 performs reproduction processing, such as decoding processing for decompressing the compressed data, on the content supplied from the recording medium 14. The reproduction processing section 15 outputs the data (data of an image for a left eye and data of an image for a right eye) of a 3D image and the sound data, which are obtained by performing the reproduction processing, to the characteristic extracting section 18.

In addition, the reproduction processing section 15 outputs the data of the 3D image to a content control section 16. The sound data, which is used to output a sound in accordance with an image of the content, is output to an external speaker or the like through a circuit (not shown). In addition, the image data, which is supplied to the characteristic extracting section 18 and from which a characteristic is to be extracted, may be either one of the data of an image for a left eye and the data of an image for a right eye included in the 3D content. In addition, either the image data or the sound data may be used as an object from which a characteristic is to be extracted.

When displaying a 3D image because the current reproduction position is a position of a main program section, the content control section 16 outputs to a display control section 17 the data of the 3D image supplied from the reproduction processing section 15.

In addition, when displaying a 2D image because the current reproduction position is a position of a commercial section, the content control section 16 outputs either the data of an image for a left eye or the data of an image for a right eye, which is supplied from the reproduction processing section 15, to the display control section 17 as the data of a 3D image.

The display control section 17 displays the image of the main program section on the TV 2 as a 3D image and displays the image of the commercial section on the TV 2 as a 2D image on the basis of the image data supplied from the content control section 16.

The characteristic extracting section 18 extracts the characteristics of the image data and the sound data supplied from the reproduction processing section 15 and outputs the characteristic data, which is data indicating the extracted characteristics, to the system controller 11. For example, the position of a scene change is detected from the image data and the position of a silent section is detected from the sound data.

A signal output section 19 transmits to the shutter glasses 3 a control signal supplied from the system controller 11. When displaying a 3D image on the TV 2, a control signal for operating the shutter of the shutter glasses 3 is supplied from the system controller 11 at a display timing of each of the image for a left eye and the image for a right eye. Moreover, when displaying a 2D image on the TV 2, a control signal for making the characteristics (shutter operations) of the light transmissive section on the left eye side and the light transmissive section on the right eye side of the shutter glasses 3 equal is supplied.

In the shutter glasses 3 which received the control signal transmitted from the signal output section 19, the shutter operations of the light transmissive section on the left eye side and the light transmissive section on the right eye side are controlled, or control for making the characteristics equal is performed. When the characteristics of the light transmissive section on the left eye side and the light transmissive section on the right eye side become the same, the image displayed on the TV 2 is recognized as a normal 2D image by the user.

FIGS. 4A and 4B are views showing an example of control of the shutter glasses 3.

As shown in FIG. 4A, when the reproduction position of content changes from a main program section to a commercial section, a control signal is transmitted to the shutter glasses 3 so that the characteristics of light transmissive sections on the left and right sides of the shutter glasses 3 become the same.

The left image in FIG. 4A shows a state of the shutter glasses 3 when the characteristics of the light transmissive sections on the left and right sides of the shutter glasses 3 are different (open timing and close timing are different). In this state, an image for a left eye reaches a left eye and an image for a right eye reaches a right eye. In addition, the right image in FIG. 4A shows a state of the shutter glasses 3 when the characteristics of the light transmissive sections on the left and right sides of the shutter glasses 3 are the same (open timing and close timing are the same). In this state, an image displayed on the TV 2 reaches the left and right eyes simultaneously.

In addition, 3D display may also be realized in the color filter method of making the user view images with changed colors as an image for a left eye and an image for a right eye. In this case, it is possible to use glasses capable of controlling the color of each light transmissive section, like red for the light transmissive section on the left eye side and blue for the light transmissive section on the right eye side.

The left image in FIG. 4B shows a state of glasses when the characteristics of light transmissive sections on the left and right sides are different (colors are different). In addition, the right image in FIG. 4B shows a state of glasses when the characteristics of light transmissive sections on the left and right sides are equal (in the case of the same color). When the reproduction position becomes a position of a commercial section from a position of a main program section, the characteristics of the glasses are changed to the state shown at the right side in FIG. 4B. As a result, the user can see the image of the commercial section as a 2D image.

Figure 5:
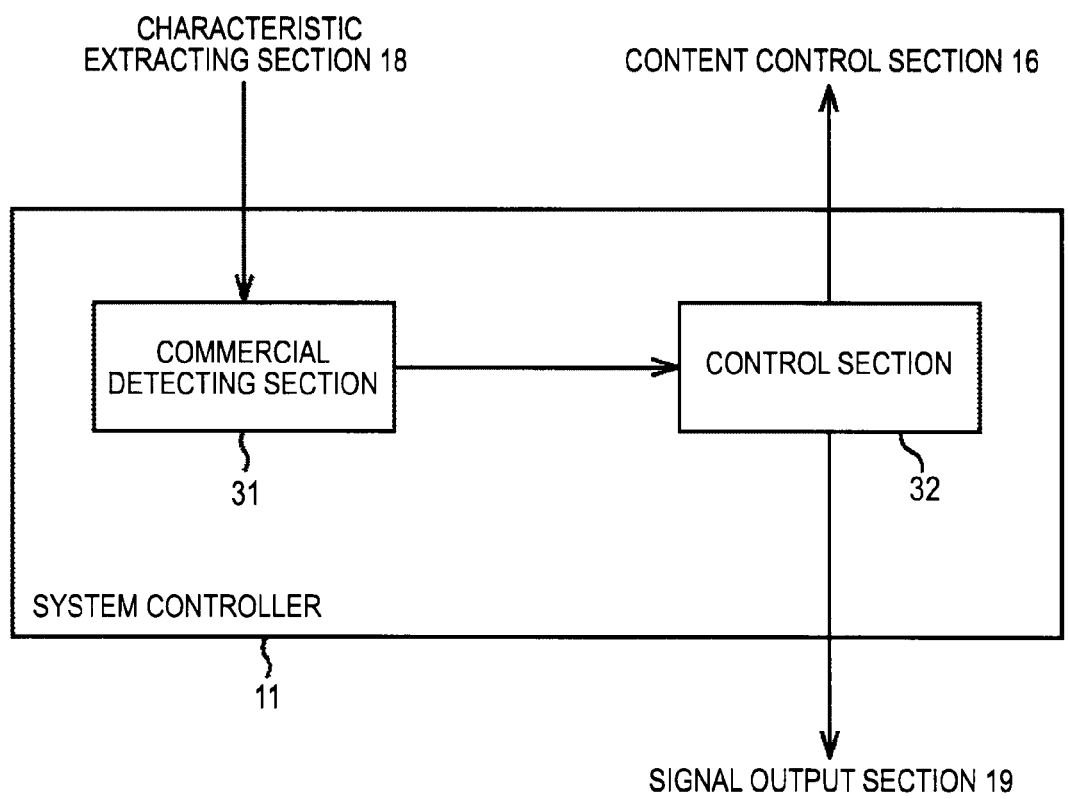
FIG. 5 is a block diagram showing an example of the configuration of a system controller.

FIG. 5 is a block diagram showing an example of the configuration of the system controller 11 in FIG. 3.

As shown in FIG. 5, a system controller 11 includes a commercial detecting section 31 and a control section 32. The characteristic data output from the characteristic extracting section 18 is input to the commercial detecting section 31.

The commercial detecting section 31 detects a commercial section on the basis of the characteristic data. When a television commercial broadcast in Japan is considered, there is a characteristic that a silent section can be detected for every period of integral multiples of 15 seconds. For example, when the information on a silent section included in the characteristic data indicates that silent sections were detected for every period of integral multiples of 15 seconds, the commercial detecting section 31 detects a section between the silent sections as a section of a television commercial. In addition, the method of detecting a commercial section is not limited to a method using silent sections, but other methods may also be used as long as they are methods using a characteristic extracted from the image data and a characteristic extracted from the sound data.

The commercial detecting section 31 outputs the information on the detected commercial section to the control section 32. In addition, the commercial detecting section 31 sets a section other than the commercial section as a main program section and outputs the information on the main program section to the control section 32.

The control section 32 monitors the current reproduction position of content during reproduction of the content. When the current reproduction position is a position of a main program section, the control section 32 controls the content control section 16 to output the data of an image for a left eye and the data of an image for a right eye. In addition, when the current reproduction position is a position of a commercial section, the control section 32 controls the content control section 16 to output the data of an image for a left eye, for example.

In addition, the control section 32 controls reproduction and display of the content and also controls the characteristics of the shutter glasses 3 by outputting a control signal to the signal output section 19.

[Operation of the Display Controller 1]

Figure 6:
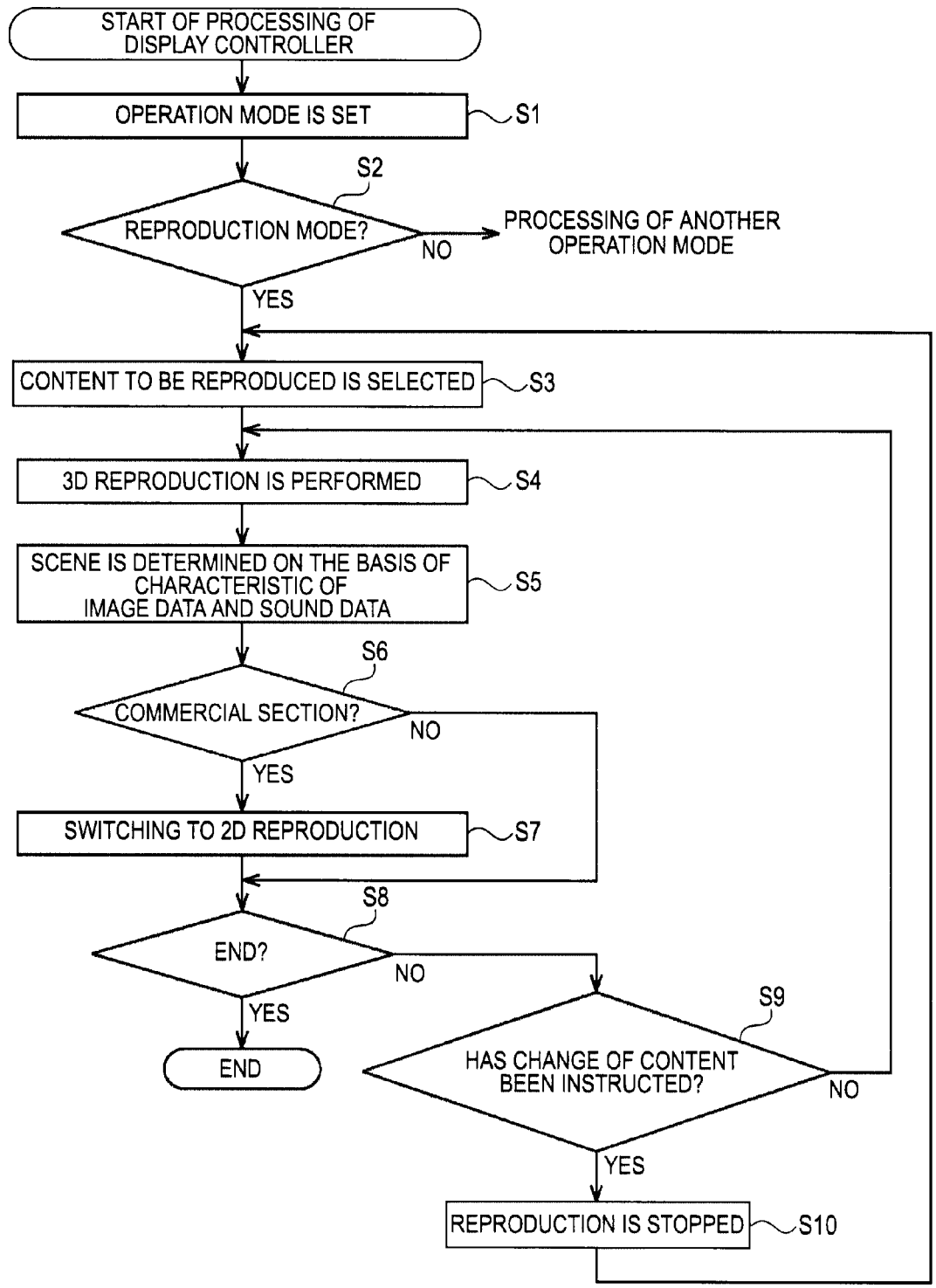
FIG. 6 is a flow chart for explaining processing of a display controller.

Processing of the display controller 1 will be described with reference to a flow chart shown in FIG. 6.

In step S1, the system controller 11 sets an operation mode in response to a user's operation. For example, the system controller 11 sets a reproduction mode as an operation mode when reproduction of the content recorded on the recording medium 14 is instructed and sets a recording mode as an operation mode when recording of the content being broadcast is instructed.

In step S2, the system controller 11 determines whether or not the set mode is a reproduction mode. If it is determined that the set mode is not a reproduction mode, the system controller 11 performs processing corresponding to the operation mode which is currently set.

On the other hand, if it is determined that the set mode is a reproduction mode in step S2, the system controller 11 controls the recording medium control section 13 to read the content selected by the user in step S3. The content to be reproduced, which has been read by the recording medium control section 13, is supplied to the reproduction processing section 15.

In step S4, the control section 32 of the system controller 11 controls each section to perform. 3D reproduction of content to be reproduced. The data of the 3D image obtained by the reproduction processing in the reproduction processing section 15 is supplied to the display control section 17 through the content control section 16, and the data is used to display the image of the content as a 3D image. In addition, the image data and the sound data obtained by the reproduction processing in the reproduction processing section 15 are also supplied to the characteristic extracting section 18.

In step S5, the characteristic extracting section 18 extracts the characteristics of the image data and the sound data and outputs the characteristic data to the system controller 11. The commercial detecting section 31 of the system controller 11 detects a commercial section and supplies the information to the control section 32.

In step S6, the control section 32 determines whether or not the current reproduction position is a position of a commercial section.

If it is determined that the current reproduction position is a position of a commercial section in step S6, the control section 32 controls each section to change the content reproduction method to 2D reproduction in step S7. That is, for example, the data of the image for a left eye of the data of the image for a left eye and the data of the image for a right eye obtained by the reproduction processing in the reproduction processing section 15 is selected by the content control section 16 and is then output to the display control section 17. On the basis of the data supplied from the content control section 16, the display control section 17 displays an image. As a result, an image of the commercial section is displayed on the TV 2 as a 2D image. 2D reproduction continues until the commercial section ends. If it is determined that the current reproduction position is not a position of a commercial section in step S6, step S7 is skipped.

In step S8, the system controller 11 determines whether to end reproduction of the content. If it is determined that the reproduction is not ended, the system controller 11 determines whether or not change of the content to be reproduced has been instructed by the user.

If it is determined that the change of the content has not been instructed in step S9, the system controller 11 performs the processing from step S4.

If it is determined that the change of the content has been instructed in step S9, the system controller 11 controls the reproduction processing section 15 to stop reproduction of the content in step S10. Then, the process returns to step S3 to repeat subsequent processing.

If it is determined that the reproduction of the content is ended in step S8 since ending the reproduction of the content has been instructed by the user or the content has been reproduced to the last, the processing ends.

Through the above processing, it is made possible to watch 3D content effectively while alleviating a feeling of fatigue of the user.

[Modifications]

Although the reproduction method is changed according to whether or not the reproduction position is a main program section or a commercial section, that is, according to a scene in the above description, the reproduction method may also be changed according to a time from the start of reproduction of 3D content.

Figure 7:
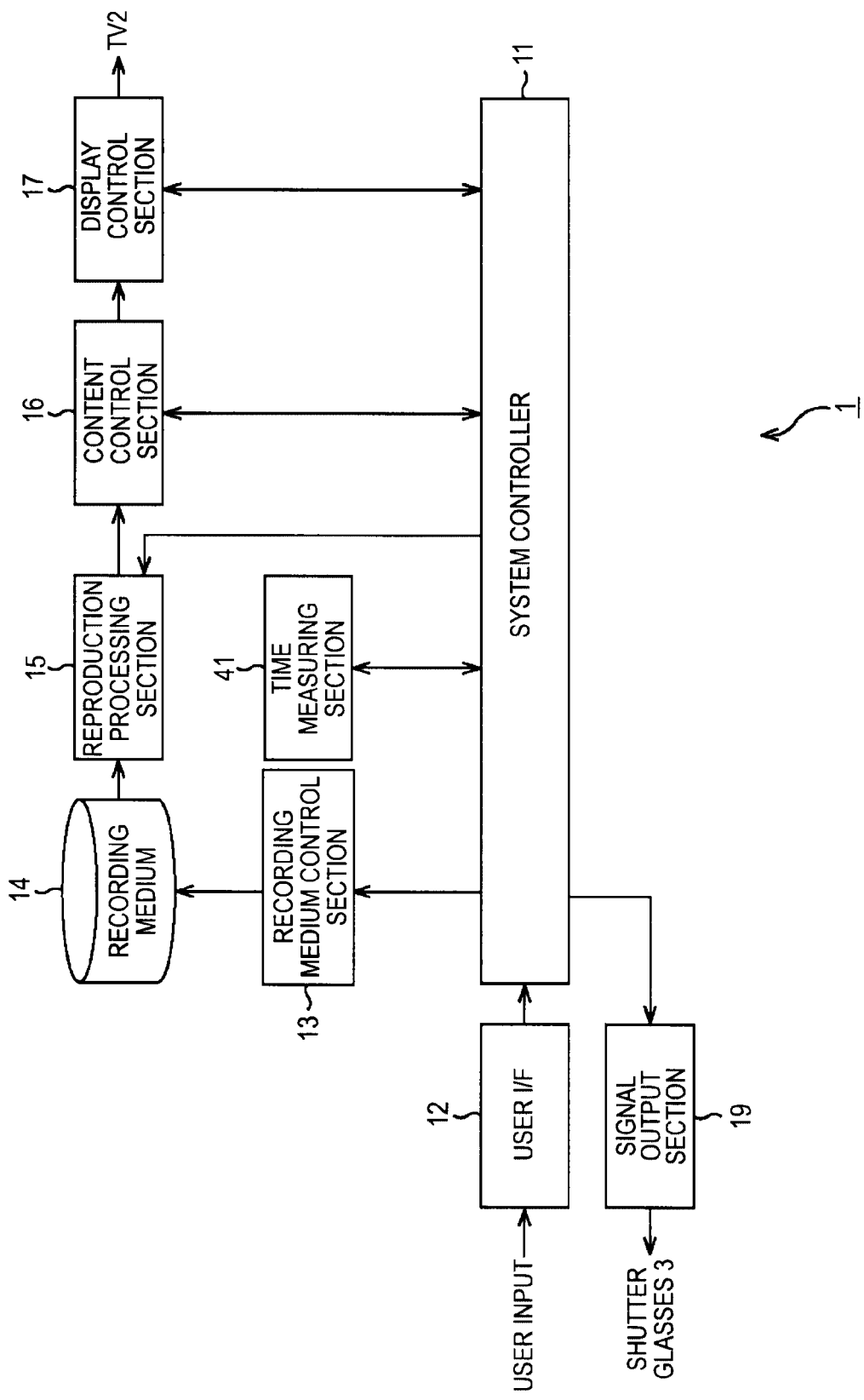
FIG. 7 is a view showing another example of the configuration of a 3D image display system.

FIG. 7 is a block diagram showing another example of the configuration of the display controller 1.

In the configuration shown in FIG. 7, the same constituent components as in the configuration shown in FIG. 3 are denoted by the same reference numerals. A repeated explanation will be appropriately omitted. The configuration shown in FIG. 7 is different from the configuration shown in FIG. 3 in that a time measuring section 41 is provided instead of the characteristic extracting section 18 shown in FIG. 3.

The system controller 11 performs 3D reproduction of predetermined 3D content recorded on the recording medium 14, for example, in response to an instruction from the user and displays a 3D image on the TV 2. The system controller 11 controls the time measuring section 41 to start the measurement of 3D reproduction time which is a time for which 3D reproduction is performed.

When it is determined that the 3D reproduction time has exceeded a time set beforehand, such as 1 hour or 2 hours, the system controller 11 changes the reproduction method to 2D reproduction to display a 2D image.

Thus, since it is possible to forcibly end watching 3D images continuously for a long time, a feeling of fatigue of the user can be alleviated.

First Example of Operation

Figure 8:
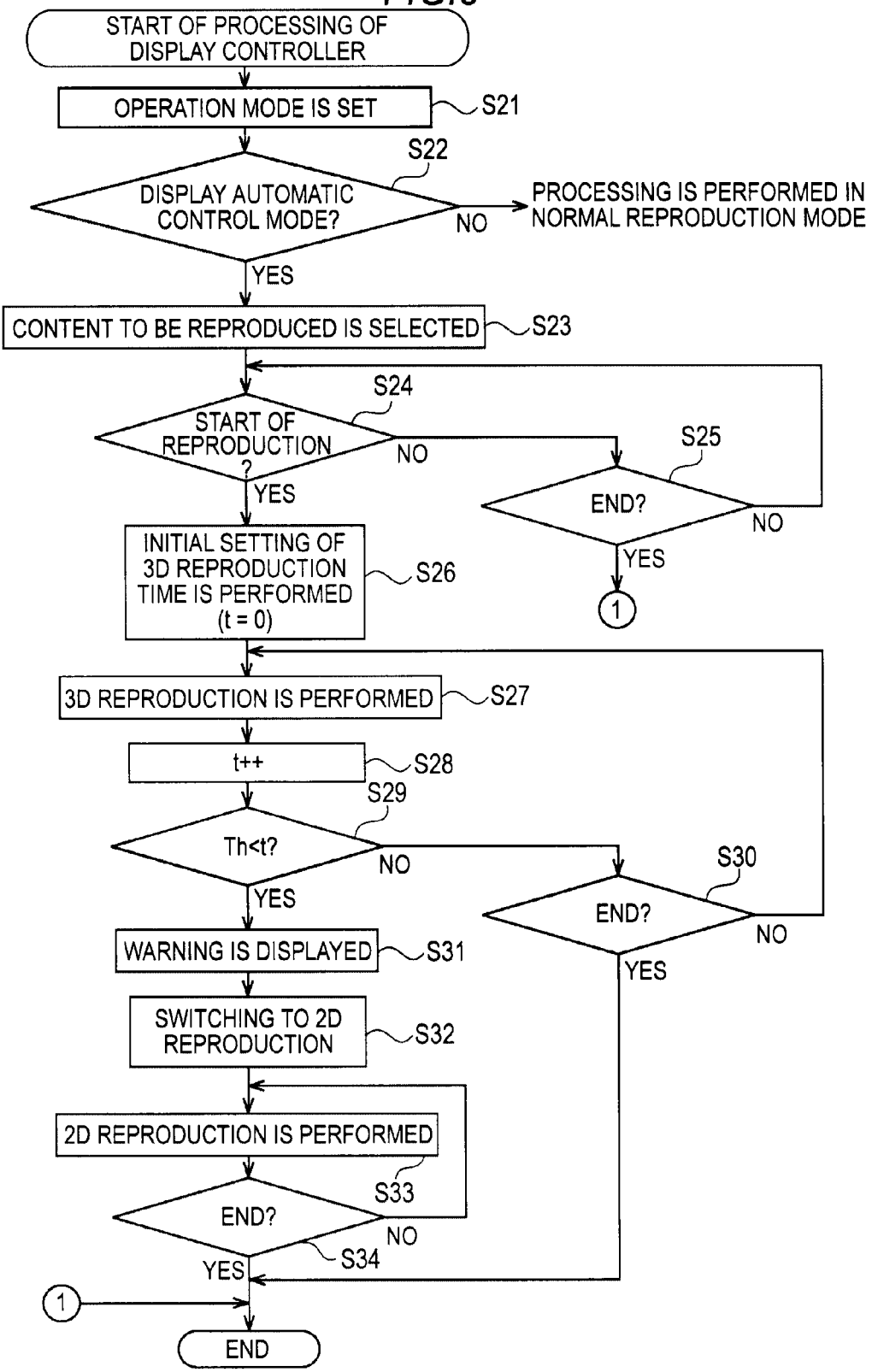
FIG. 8 is a flow chart showing processing of the display controller in FIG. 7.

Processing of the display controller 1 in FIG. 7 which changes a reproduction method according to a time will be described with reference to a flow chart shown in FIG. 8.

In step S21, the system controller 11 sets an operation mode in response to a user's operation.

For example, the system controller 11 sets a reproduction mode as an operation mode when reproduction of the content recorded on the recording medium 14 is instructed and sets a recording mode as an operation mode when recording of the content being broadcast is instructed. Moreover, when setting a display automatic control mode, which is a mode in which a reproduction mode is automatically changed to 2D reproduction when the 3D reproduction time exceeds the predetermined time, is instructed in the reproduction mode, the system controller 11 sets the display automatic control mode.

In step S22, the system controller 11 determines whether or not the set mode is a display automatic control mode. If it is determined that the set mode is not a display automatic control mode, the system controller 11 performs processing corresponding to the operation mode which is currently set. For example, when a normal reproduction mode (reproduction mode which is not the display automatic control mode) is set, 3D reproduction is started and display of a 3D image continues without time restriction.

On the other hand, if it is determined that the set mode is a display automatic control mode in step S22, the system controller 11 makes the recording medium control section 13 read the content selected by the user in step S23.

In step S24, the system controller 11 determines whether or not starting the reproduction of content has been instructed.

If it is determined that starting the reproduction of content has not been instructed in step S24, the system controller 11 determines whether to end the processing in step S25. If it is determined that the processing is ended, the system controller 11 ends the processing. On the other hand, if it is determined that the processing is not ended in step S25, the system controller 11 repeats the processing from step S24.

If it is determined that starting the reproduction of content has been instructed in step S24, the system controller 11 performs initial setting (t=0) of a 3D reproduction time t, which is measured by the time measuring section 41, in step S26.

In step S27, the control section 32 of the system controller 11 controls each section to perform 3D reproduction of content to be reproduced.

In step S28, the system controller 11 controls the time measuring section 41 to increment the 3D reproduction time t.

In step S29, the system controller 11 determines whether or not the 3D reproduction time t has exceeded a warning time Th which is a time set beforehand as a threshold value. For example, a time, such as 1 hour or 2 hours, is set as the warning time Th.

If it is determined that the 3D reproduction time t does not exceed the warning time Th in step S29, the system controller 11 determines whether to end the reproduction of the content in step S30.

If it is determined that the reproduction of the content is ended in step S30, the system controller 11 ends the processing. If it is determined that the reproduction of the content is not ended in step S30, the system controller 11 repeats the processing from step S27.

On the other hand, if it is determined that the 3D reproduction time t has exceeded the warning time Th in step S29, the system controller 11 controls the display control section 17 to display a warning on the TV 2 in step S31. For example, a message notifying that the 3D reproduction will be ended is displayed on the TV 2.

The system controller 11 changes the reproduction method to 2D reproduction in step S32 and performs 2D reproduction in step S33. According to control of the system controller 11, for example, only the data of an image for a left eye is supplied from the content control section 16 to the display control section 17, and the image of a commercial section is displayed as a 2D image on the basis of the data.

In step S34, the system controller 11 determines whether to end reproduction of the content. If it is determined that the reproduction is not ended, the process returns to step S33 to repeat 2D reproduction of content.

If it is determined that the reproduction of the content is ended in step S34 since ending the reproduction of the content has been instructed by the user or the content has been reproduced to the last, the processing ends.

Through the above processing, it is possible to prevent watching 3D images continuously for a predetermined period of time or more. As a result, a feeling of fatigue of the user can be alleviated.

Second Example of Operation

Figure 9:
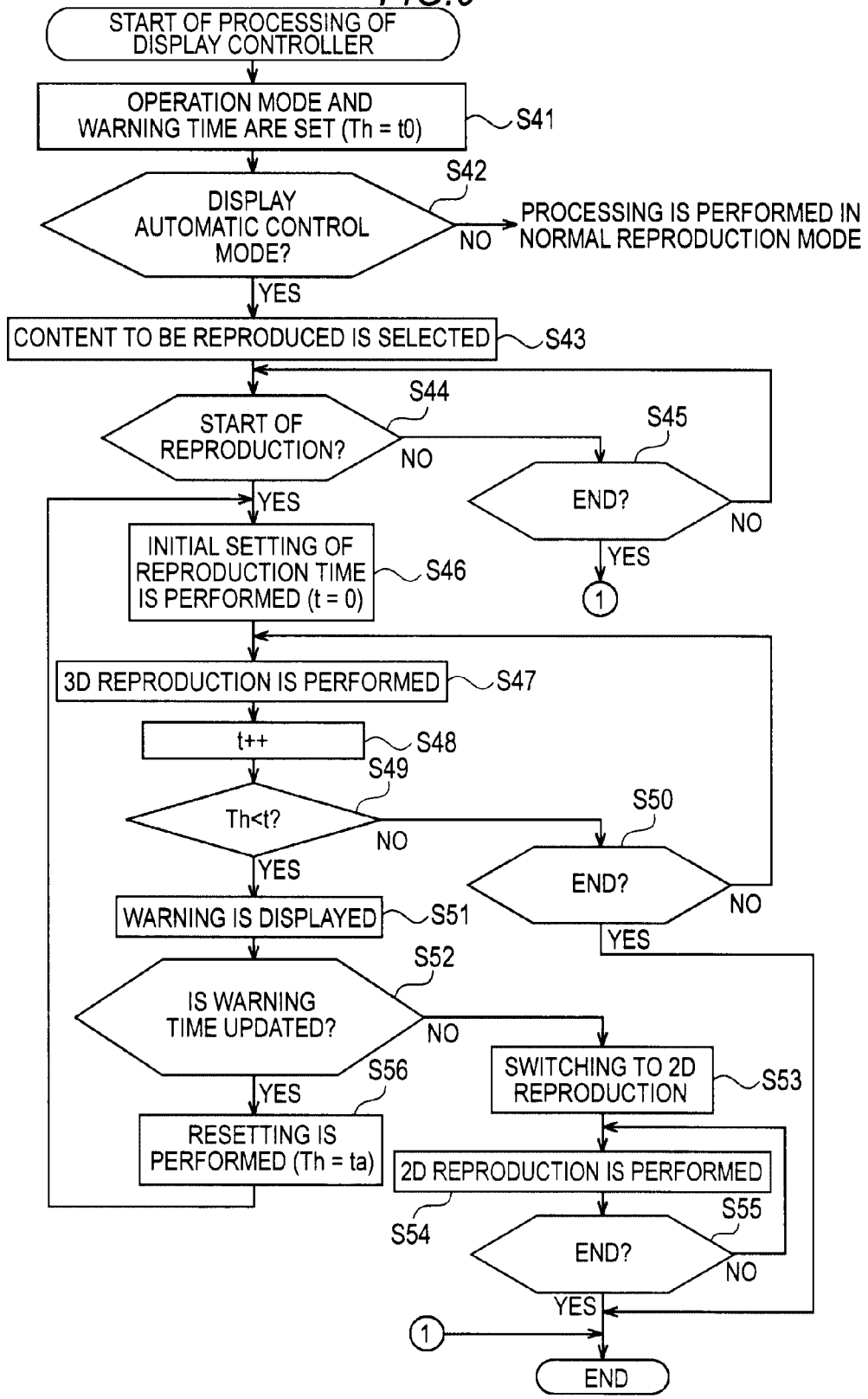
FIG. 9 is a flow chart showing another processing of the display controller in FIG. 7.

Another processing of the display controller 1 in FIG. 7 which changes a reproduction method according to a time will be described with reference to a flow chart shown in FIG. 9.

In this processing, a user may extend a time of 3D reproduction by a predetermined time when a warning, which notifies that 3D reproduction will be ended, is displayed. The processing shown in FIG. 9 is basically the same as the processing described with reference to FIG. 8 except for the point that such extension processing is added.

In step S41, the system controller 11 sets an operation mode and also sets a warning time Th (Th=t0), which is a time until a warning is displayed after 3D reproduction is started, in response to a user's operation.

In step S42, the system controller 11 determines whether or not the set mode is a display automatic control mode. If it is determined that the set mode is not a display automatic control mode, the system controller 11 performs processing corresponding to the operation mode which is currently set.

On the other hand, if it is determined that the set mode is a display automatic control mode in step S42, the system controller 11 makes the recording medium control section 13 read the content selected by the user in step S43.

In step S44, the system controller 11 determines whether or not starting the reproduction of content has been instructed.

If it is determined that starting the reproduction of content has not been instructed in step S44, the system controller 11 determines whether to end the processing in step S45. If it is determined that the processing is ended, the system controller 11 ends the processing. On the other hand, if it is determined that the processing is not ended in step S45, the system controller 11 repeats the processing from step S44.

If it is determined that starting the reproduction of content has been instructed in step S44, the system controller 11 performs initial setting (t=0) of the 3D reproduction time t, which is measured by the time measuring section 41, in step S46.

In step S47, the control section 32 of the system controller 11 controls each section to perform 3D reproduction of content to be reproduced.

In step S48, the system controller 11 controls the time measuring section 41 to increment the 3D reproduction time t.

In step S49, the system controller 11 determines whether or not the 3D reproduction time t has exceeded the warning time Th which is currently set.

If it is determined that the 3D reproduction time t does not exceed the warning time Th in step S49, the system controller 11 determines whether to end the reproduction of the content in step S50.

If it is determined that the reproduction of the content is ended in step S50, the system controller 11 ends the processing. If it is determined that the reproduction of the content is not ended in step S50, the system controller 11 repeats the processing from step S47.

On the other hand, if it is determined that the 3D reproduction time t has exceeded the warning time Th in step S49, the system controller 11 controls the display control section 17 to display a warning on the TV 2 in step S51.

Here, for example, a message, which notifies a user that a time after the start of 3D reproduction has exceeded a predetermined time, and a message, which asks the user whether to extend the 3D reproduction time by updating the warning time, are displayed on the TV 2. The user can select whether to perform 2D reproduction by ending 3D reproduction or to continue the 3D reproduction by updating the warning time by operating a remote controller, for example.

In step S52, the system controller 11 determines whether or not updating the warning time has been selected.

If it is determined that updating the warning time has not been selected in step S52, the system controller 11 changes the reproduction method to 2D reproduction in step S53.

In step S54, the system controller 11 performs 2D reproduction. According to control of the system controller 11, for example, only the data of an image for a left eye is supplied from the content control section 16 to the display control section 17, and a 2D image is displayed on the basis of the data.

In step S55, the system controller 11 determines whether to end reproduction of the content. If it is determined that the reproduction is not ended, the process returns to step S54 to repeat 2D reproduction of content.

If it is determined that the 2D reproduction of the content is ended in step S55 since ending the reproduction of the content has been instructed by the user or the content has been reproduced to the last, the processing ends.

On the other hand, if it is determined that updating the warning time has been selected in step S52, the system controller 11 sets a time Ta, which is a predetermined time, as the warning time Th in step S56. Then, the processing from step S46 is repeated. For example, a time which is shorter than the warning time Th set in step S41 is reset in step S56.

Through the above processing, it is possible to prevent watching 3D images continuously for a predetermined period of time or more. As a result, a feeling of fatigue of the user can be alleviated. In addition, even if the user has watched 3D images continuously for a predetermined period of time, it is possible to select whether or not to continue the 3D reproduction according to selection of the user.

Example of Content to be Reproduced

Although content to be reproduced is 3D content in which the data of an image for a left eye and the data of an image for a right eye are prepared beforehand, 2D content may also be used as an object to be reproduced.

In this case, 3D reproduction is performed using 3D content generated on the basis of 2D content in a main program section, and 2D reproduction is performed using 2D content to be reproduced in a commercial section.

Conversion of 2D content into 3D content, which is performed when the reproduction position of content is in a main program section, will be described. Conversion of 2D content into 3D content is performed by the content control section 16, for example.

Figure 10:
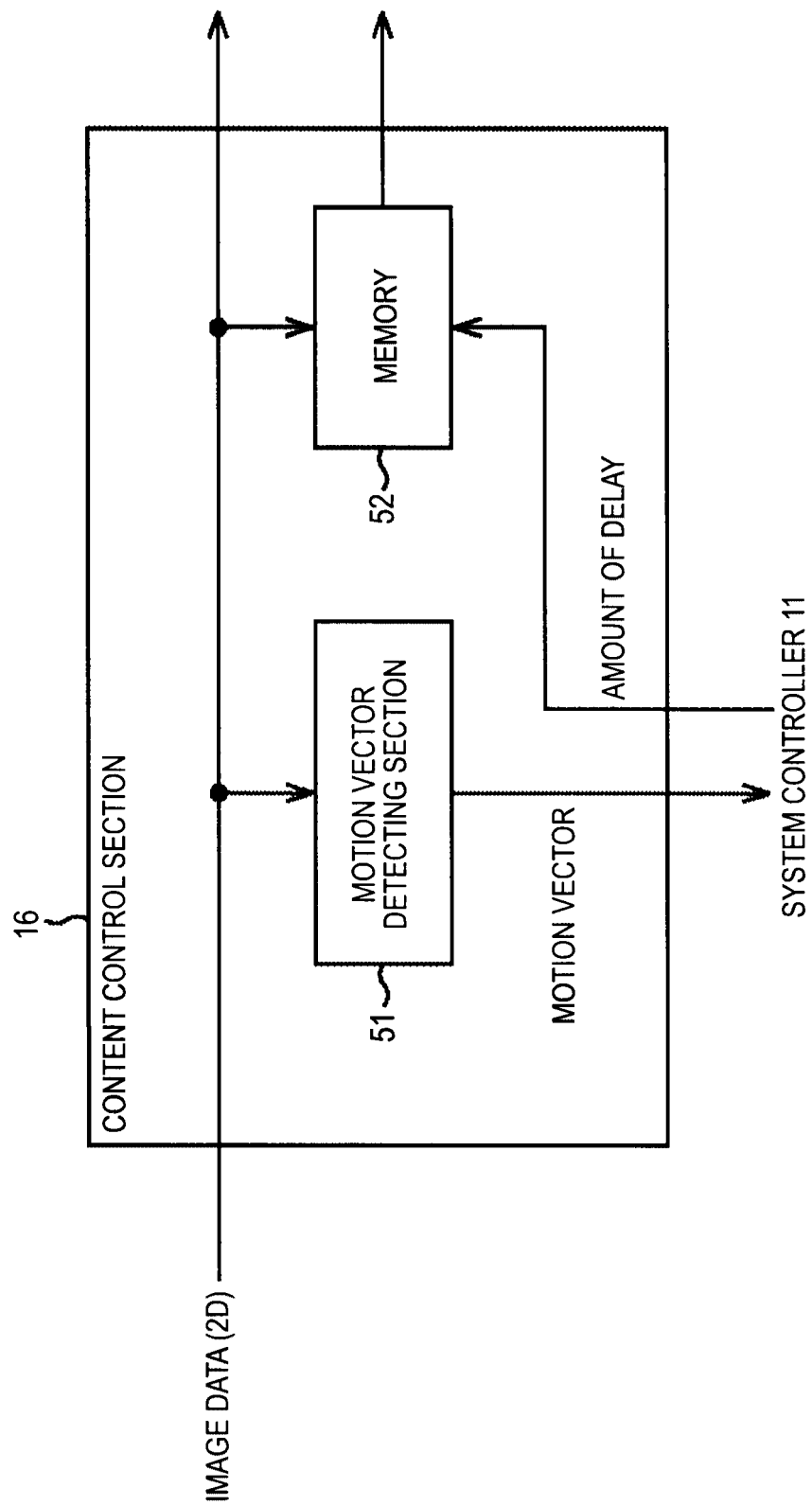
FIG. 10 is a block diagram showing an example of the configuration of a content control section.

FIG. 10 is a block diagram showing an example of the configuration of the content control section 16.

Converting the data of a 2D image into the data of a 3D image is disclosed in JP-A-7-222203, for example. The configuration shown in FIG. 10 is basically the same configuration as that disclosed in JP-A-7-222203.

As shown in FIG. 10, the content control section 16 includes a motion vector detecting section 51 and a memory 52. The data of a 2D image output from the reproduction processing section 15 after reproduction processing of 2D content is performed is input to the motion vector detecting section 51 and the memory 52 and is also output to the display control section 17 as it is.

When the reproduction position of content is a position of a commercial section, the data of a 2D image output as it is from the content control section 16 is used in the display control section 17 in order to display a 2D image. In addition, when the reproduction position of content is a position of a main program section, the data of a 2D image output as it is from the content control section 16 is used in the display control section 17, for example, as data of an image for a left eye for displaying a 3D image.

The motion vector detecting section 51 detects a motion vector, which indicates a motion of a subject between frames, on the basis of the input image data, and outputs it to the system controller 11. In the system controller 11, the amount of delay of the memory 52 is controlled according to the size of, for example, a horizontal component of the motion vector detected by the motion vector detecting section 51. For example, the amount of delay T0 is matched with the size V0 of a horizontal component of a motion vector as a reference. When the size of the horizontal component of the detected motion vector is V1 which is larger than V0, T1 which is smaller than T0 is selected as the amount of delay and the amount of delay of the memory 52 is controlled. In addition, when the size of the horizontal component of the detected motion vector is V2 which is smaller than V0, T2 which is larger than T0 is selected as the amount of delay and the amount of delay of the memory 52 is controlled.

When displaying a 3D image, the memory 52 temporarily stores the input image data, delays the image data by the amount of delay supplied from the system controller 11, and outputs it. The image data output from the memory 52 is used as data of an image for a right eye when displaying a 3D image. The user, who watches the image for a left eye and the image for a right eye output as a 3D image from the content control section 16 with such a configuration, feels a subject stereoscopically by the time difference between the left and right images. The Mach-Dvorak phenomenon is known as a phenomenon similar to feeling a subject stereoscopically by the time difference between left and right images.

Figure 11:
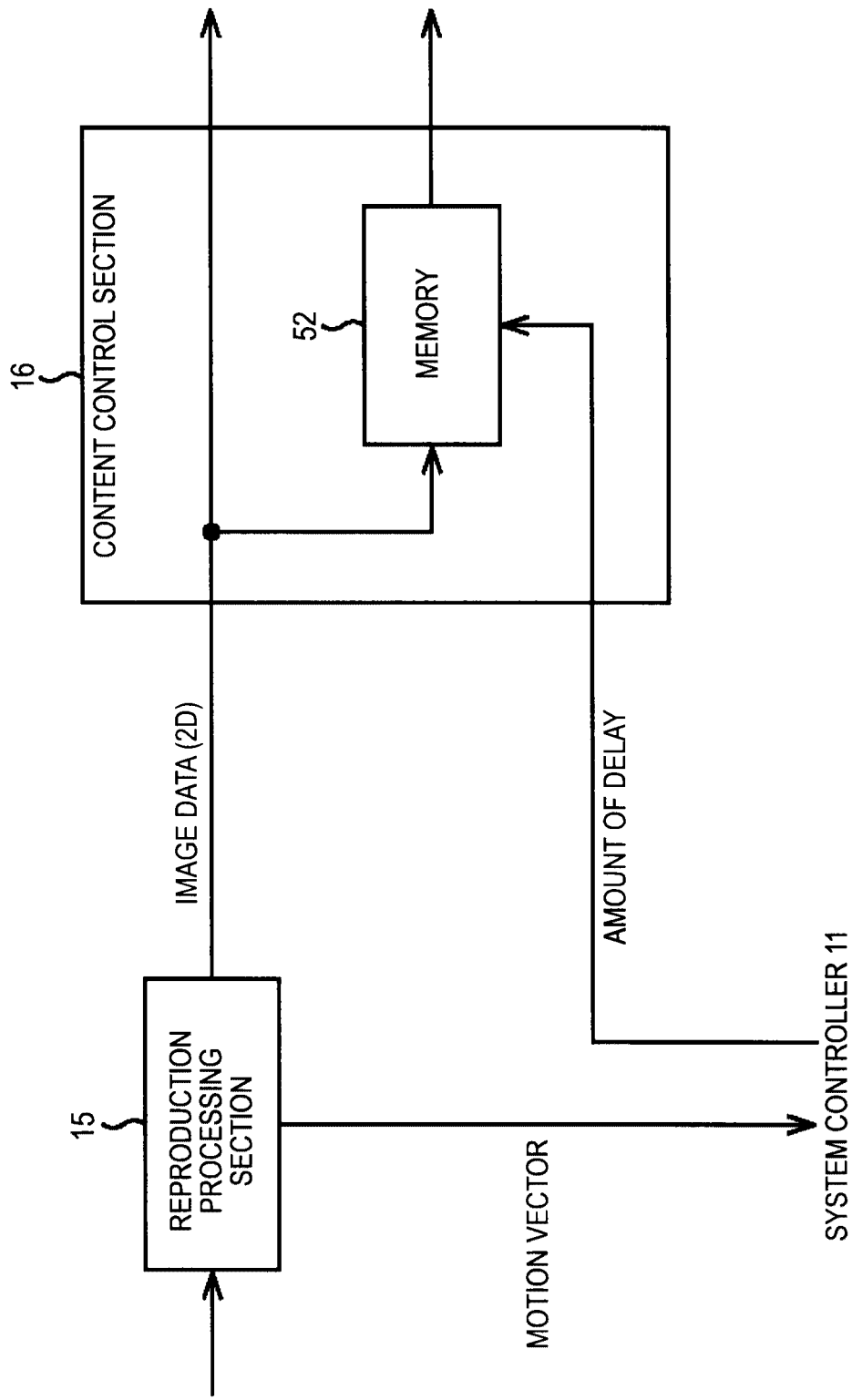
FIG. 11 is a block diagram showing another example of the configuration of the content control section.

FIG. 11 is a block diagram showing another example of the configuration of the content control section 16.

In this example, a constituent component for detecting a motion vector is not provided in the content control section 16, and the information on a motion vector as a reference for controlling the amount of delay of the memory 52 is supplied from the reproduction processing section 15 to the system controller 11. When the compression method of image data input to the reproduction processing section 15 is an MPEG (Moving Picture Experts Group) 2 or H.264/AVC, for example, the information on a motion vector is included in the image data.

The reproduction processing section 15 outputs the information on the motion vector included in the input image data to the system controller 11 and outputs the data of a 2D image, which is obtained by performing reproduction processing, to the content control section 16. In the system controller 11, the amount of delay is determined on the basis of the motion vector, and the information indicating the determined amount of delay is supplied to the memory 52.

The data of a 2D image output from the reproduction processing section 15 is input to the memory 52 and is also output to the display control section 17 as it is. The data of a 2D image output as it is from the content control section 16 is used when displaying a 2D image in a commercial section. Moreover, when displaying a 3D image in a main program section, it is used as data of an image for a left eye, for example.

When displaying a 3D image, the memory 52 temporarily stores the input image data, delays the image data by the amount of delay supplied from the system controller 11, and outputs it. The image data output from the memory 52 is used, for example, as data of an image for a right eye when displaying a 3D image.

Thus, even if content to be reproduced is 2D content, it is possible to generate the data of an image for a left eye and the data of an image for a right eye on the basis of the 2D content. As a result, it is possible to display an image of a main program section as a 3D image on the basis of the generated data. In addition, it is possible to change the reproduction method of an image according to a scene being reproduced, like displaying an image of a main program section as a 3D image and displaying an image of a commercial section as a 2D image.

In addition, when the content control section 16 has a configuration shown in FIGS. 10 and 11, the display controller 1 may control parallax between an image for a left eye and an image for a right eye by changing the amount of delay so that it is possible to change a three-dimensional effect that the user who watches a 3D image feels.

In this case, a three-dimensional effect of a 3D image may be changed according to a scene, like displaying an image of a main program section as a 3D image showing a more projected subject and displaying an image of a commercial section as a 3D image showing a less projected subject. Also in this case, since eyes of the user can rest in the commercial section, it is possible to alleviate a feeling of fatigue.

Moreover, when the relationship of the amount of motion vector v and the amount d of parallax parameter (amount of delay) d in FIGS. 10 and 11 is expressed by the following expression (1), a three-dimensional effect may be decreased as the 3D reproduction time becomes long by controlling the value of the coefficient k according to the reproduction time.

$$d=kv \qquad (1)$$

In FIG. 1, the display controller 1 is prepared as a separate device from the TV 2 and functions as an output device that changes the image data which is output according to the current reproduction position. However, the display controller 1 may be provided in the TV 2.

In addition, although the display controller 1 changes the image data to be output according to whether the current reproduction position is a main program section or a commercial section in FIG. 1, switching of the image data may be performed on the TV 2 side.

Figure 12:
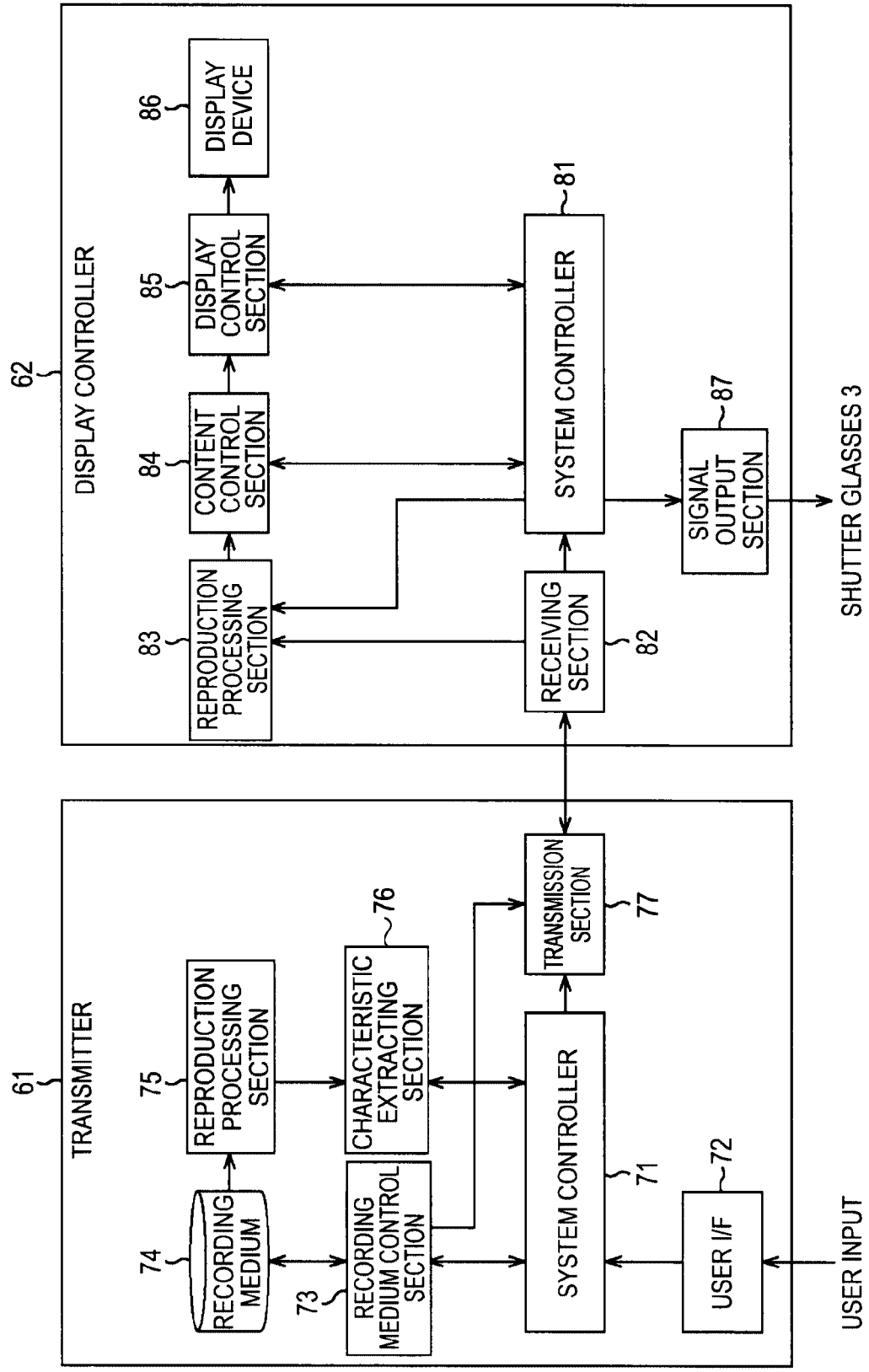
FIG. 12 is a view showing an example of the configuration of a 3D image display system according to another embodiment of the present invention.

FIG. 12 is a view showing another example of the configuration of a 3D image display system.

The 3D image display system shown in FIG. 12 includes a transmitter 61 and a display controller 62. The display controller 62 is a device provided in the TV 2, for example, and communicates with the transmitter 61, which is provided outside as a separate device from the TV 2, through a cable that meets the HDMI specifications.

In the 3D image display system shown in FIG. 12, the transmitter 61 detects a commercial section, and the information on the commercial section is transmitted from the transmitter 61 to the display controller 62 together with 3D content. The display controller 62 reproduces the 3D content transmitted from the transmitter 61, such that display of an image is switched according to whether the current reproduction position is a main program section or a commercial section.

As shown in FIG. 12, the transmitter 61 includes a system controller 71, a user I/F 72, a recording medium control section 73, a recording medium 74, a reproduction processing section 75, a characteristic extracting section 76, and a transmission section 77. The user I/F 72, the recording medium control section 73, the recording medium 74, the reproduction processing section 75, and the characteristic extracting section 76 are equivalent to the user I/F 12, the recording medium control section 13, the recording medium 14, the reproduction processing section 15, and the characteristic extracting section 18 shown in FIG. 3, respectively.

The system controller 71 controls the overall operation of the transmitter 61 according to a signal indicating the content of a user operation supplied from the user I/F 72.

For example, the system controller 71 detects a commercial section of a program, which is to be reproduced, on the basis of the characteristic data supplied from a characteristic extracting section 76. The system controller 71 outputs to the transmission section 77 the information on the position of the detected commercial section.

The user I/F 72 detects a user operation on a remote controller, such as an operation of selecting a program to be reproduced, and outputs a signal indicating the content to the system controller 71.

The recording medium control section 73 receives broadcast 3D content on the basis of a signal from an antenna (not shown) and records it on the recording medium 74. The recording medium control section 73 outputs 3D content to be reproduced to the reproduction processing section 75 when reproduction of the 3D content recorded on the recording medium 74 is instructed. In addition, the recording medium control section 73 outputs the 3D content to be reproduced to the transmission section 77.

The reproduction processing section 75 reproduces reproduction processing, such as decoding processing for decompressing the compressed data, on the 3D content to be reproduced. The reproduction processing section 75 outputs the data (data of an image for a left eye and data of an image for a right eye) of a 3D image and the sound data, which are obtained by performing the reproduction processing, to the characteristic extracting section 76. In addition, the image data, which is supplied to the characteristic extracting section 76 and from which a characteristic is to be extracted, may be either one of the data of an image for a left eye and the data of an image for a right eye included in the 3D content. In addition, either the image data or the sound data may be used as an object from which a characteristic is to be extracted.

The characteristic extracting section 76 extracts the characteristics of the image data and the sound data supplied from the reproduction processing section 75 and outputs the characteristic data, which is data indicating the extracted characteristics, to the system controller 71. For example, the position of a scene change is detected from the image data and the position of a silent section is detected from the sound data.

The transmission section 77 transmits the 3D content, which is supplied from the recording medium control section 73, to the display controller 62 through a cable which meets the HDMI specifications. In addition, the transmission section 77 transmits the information on a commercial section, which is supplied from the system controller 71, to the display controller 62 in a state where it is in HDMI Vender Specific InfoFrame Packet specified by version 1.4 of HDMI specifications, for example.

The HDMI Vender Specific InfoFrame Packet is a packet used for transmission and reception of a control command specified by each vendor and is transmitted from a device on the transmission side to a device on the reception side through a CEC (Consumer Electronics Control) line of HDMI. Information indicating the position (time) of the commercial section is included in the information on the commercial section. In addition, the information on a main program section may be transmitted instead of the information on a commercial section.

The display controller 62 includes a system controller 81, a receiving section 82, a reproduction processing section 83, a content control section 84, a display control section 85, a display device 86, and a signal output section 87. The reproduction processing section 83, the content control section 84, the display control section 85, and the signal output section 87 are equivalent to the reproduction processing section 15, the content control section 16, the display control section 17, and the signal output section 19 shown in FIG. 3, respectively.

The system controller 81 controls the overall operation of the display controller 62 and reproduces 3D content transmitted from the transmitter 61. In addition, the system controller 81 determines whether the current reproduction position is a main program section or a commercial section on the basis of the information on a commercial section, which has been transmitted from the transmitter 61, during reproduction of 3D content. The system controller 81 controls each section so that 3D reproduction is performed in the main program section and 2D reproduction is performed in the commercial section.

The receiving section 82 receives the information on a 3D content and a commercial section, which has been transmitted from the transmitter 61, and outputs the 3D content to the reproduction processing section 83 and outputs the information on the commercial section to the system controller 81.

The reproduction processing section 83 performs reproduction processing, such as decoding processing for decompressing the compressed data, on the 3D content supplied from the receiving section 82. The reproduction processing section 83 outputs the data of a 3D image, which is obtained by performing the reproduction processing, to the content control section 84. The sound data, which is used to output a sound in accordance with an image of the content, is output to an external speaker or the like through a circuit (not shown).

When displaying a 3D image because the current reproduction position is a position of a main program section, the content control section 84 outputs to the display control section 85 the data of the 3D image supplied from the reproduction processing section 83.

In addition, when displaying a 2D image because the current reproduction position is a position of a commercial section, the content control section 84 outputs either the data of an image for a left eye or the data of an image for a right eye, which is supplied from the reproduction processing section 83, to the display control section 85 as the data of a 3D image.

The display control section 85 displays the image of the main program section on the display device 86 as a 3D image and displays the image of the commercial section on the display device 86 as a 2D image on the basis of the image data supplied from the content control section 84.

The signal output section 87 transmits a control signal to control the shutter operation of the shutter glasses 3 as described with reference to FIGS. 4A and 4B.

Also in the 3D image display system with such a configuration, it is possible to display an image of the main program section as a 3D image and to display an image of the commercial section as a 2D image.

Moreover, although the method using glasses is set as a watching method of a 3D image in the above description, a naked-eye method may also be applied. Also in the naked-eye method, display of an image is controlled so that a user can see a 3D image in the main program section, and display of an image is controlled so that the user can see a 2D image in the commercial section.

Moreover, in the above description, the case has been explained in which one image is used as an image for a left eye and an image obtained by delaying the one image is used as an image for a right eye when generating a 3D image on the basis of a 2D image. However, it is also possible to use one image as an image for a left eye and use an image, which is obtained by shifting the position of a subject reflected on the image, as an image for a right eye.

The series of processes described above may be executed by hardware or may be executed by software. In the case of executing a series of processing using software, a program included in the software is installed from a program recording medium into a computer provided in dedicated hardware or into a general-purpose personal computer.

FIG. 13 is a block diagram showing an example of the hardware configuration of a computer which executes the series of processing described above using a program.

A CPU (Central Processing Unit) 101, a ROM (Read Only Memory) 102, and a RAM (Random Access Memory) 103 are connected to each other by a bus 104.

In addition, an input/output interface 105 is connected to the bus 104. An input unit 106 formed by a keyboard, a mouse, and the like and an output unit 107 formed by a display device, a speaker, and the like are connected to the input/output interface 105. In addition, a storage unit 108 formed by a hard disk, a nonvolatile memory, and the like, a communication unit 109 formed by a network interface and the like, and a drive 110 which drives removable media 111 are connected to the input/output interface 105.

In the computer configured as described above, for example, the CPU 101 loads a program stored in the storage unit 108 to the RAM 103 through the input/output interface 105 and the bus 104 and executes it in order to execute the series of processing described above.

For example, the program executed by the CPU 101 is supplied in a state recorded on the removable media 111 or supplied through cable or wireless transmission media, such as a local area network, the Internet, and digital broadcasting, and is installed in the storage unit 108.

In addition, the program executed by a computer may be a program which performs processing in a time-series manner in the order described in this specification, or may be a program which performs processing in parallel or at a necessary timing, such as when a call is performed.

Embodiments of the present invention are not limited to the above-described embodiments, but various modifications may be made without departing from the spirit and scope of the present invention.

The present application contains subject matter related to that disclosed in Japanese Priority Patent Application JP 2009-254958 filed in the Japan Patent Office on Nov. 6, 2009, the entire contents of which is hereby incorporated by reference.

What is claimed is:

1. A display controller comprising:
    an extraction means for extracting a characteristic of at least one of image data and sound data of a content stream;
    a detection means for detecting a predetermined scene of the content stream on the basis of the characteristic extracted by the extraction means;
    a reproduction means for reproducing the content stream; and
    a display control means for displaying an image of the predetermined scene of the content stream so as to be recognized as a two-dimensional image and displaying an image outside of the predetermined scene of the content stream so as to be recognized as a three-dimensional image.

2. The display controller according to claim 1, further comprising:
    a conversion means for converting the input content stream into content including data of an image for a left eye and data of an image for a right eye with parallax for displaying a three-dimensional image when the content stream input as an object to be reproduced is content including only image data for displaying a two-dimensional image as image data, wherein the display control means displays an image of the content stream outside the predetermined scene on the basis of the content converted by the conversion means and displays an image of the content stream of the predetermined scene on the basis of the input content.

3. The display controller according to claim 1, wherein when the content stream input as an object to be reproduced is content including data of an image for a left eye and data of an image for a right eye with parallax as image data, the display control means displays an image of the content stream outside the predetermined scene on the basis of the input content, and displays an image of the content stream of the predetermined scene on the basis of either the data of the image for a left eye or the data of the image for a right eye.

4. The display controller according to claim 1, wherein the content stream is data of a television program, and the predetermined scene is a commercial section included in the television program.

5. A display control method comprising the steps of:

extracting a characteristic of at least one of image data and sound data of a content stream;

detecting a predetermined scene of the content on the basis of the extracted characteristic;

reproducing the content stream; and displaying an image of the predetermined scene of the content so as to be recognized as a two-dimensional image and displaying an image outside of the predetermined scene of the content stream so as to be recognized as a three-dimensional image.

6. A non-transitory computer readable medium storing a program which when executed causes a computer to execute processing including the steps of:

extracting a characteristic of at least one of image data and sound data of a content stream;

detecting a predetermined scene of the content stream on the basis of the extracted characteristic;

reproducing the content stream; and displaying an image of the predetermined scene of the content stream so as to be recognized as a two-dimensional image and displaying an image outside of the predetermined scene of the content so as to be recognized as a three-dimensional image.

7. An output device comprising:

an extraction means for extracting a characteristic of at least one of image data and sound data of a content stream;

a detection means for detecting a predetermined scene of the content stream on the basis of the characteristic extracted by the extraction means;

a reproduction means for reproducing the content stream; and an output means for outputting an image of the predetermined scene of the content stream as a two-dimensional image and outputting an image outside of the predetermined scene of the content stream as a three-dimensional image.

8. A transmitter comprising:

an extraction means for extracting a characteristic of at least one of image data and sound data of a content stream which includes image data for a left eye and image data for a right eye with parallax;

a detection means for detecting a predetermined scene of the content stream on the basis of the characteristic extracted by the extraction means; and a transmission means for transmitting data regarding the detected predetermined scene together with the image data of the content stream.

9. A display controller comprising:

a receiving means for receiving data of a content stream including at least image data and also receiving data regarding a predetermined scene detected on the basis of a characteristic of at least one of image data and sound data of the content stream;

a reproduction means for reproducing the content stream; and a display control means for displaying an image of the predetermined scene of the content so as to be recognized as a two-dimensional image and displaying an image outside of the predetermined scene of the content stream so as to be recognized as a three-dimensional image.

10. A display controller comprising:

circuitry configured as:

an extraction unit configured to extract a characteristic of at least one of image data and sound data of a content stream;

a detection unit configured to detect a predetermined scene of the content stream on the basis of the characteristic extracted by the extraction unit;

a reproduction unit configured to reproduce the content stream; and a display control unit configured to display an image of the predetermined scene of the content stream so as to be recognized as a two-dimensional image and display an image outside of the predetermined scene of the content stream so as to be recognized as a three-dimensional image.

11. An output device comprising:

circuitry configured as:

an extraction unit configured to extract a characteristic of at least one of image data and sound data of a content stream;

a detection unit configured to detect a predetermined scene of the content stream on the basis of the characteristic extracted by the extraction unit;

a reproduction unit configured to reproduce the content stream; and an output unit configured to output an image of the predetermined scene of the content stream as a two-dimensional image and output an image outside of the predetermined scene of the content stream as a three-dimensional image.

12. A transmitter comprising:

circuitry configured as:

an extraction unit configured to extract a characteristic of at least one of image data and sound data of a content stream which includes image data for a left eye and image data for a right eye with parallax;

a detection unit configured to detect a predetermined scene of the content stream on the basis of the characteristic extracted by the extraction unit; and a transmission unit configured to transmit data regarding the detected predetermined scene together with the image data of the content stream.

13. A display controller comprising:

circuitry configured as:

a receiving unit configured to receive data of a content stream including at least image data and also receive data regarding a predetermined scene detected on the basis of a characteristic of at least one of image data and sound data of the content stream;

a reproduction unit configured to reproduce the content stream; and a display control unit configured to display an image of the predetermined scene of the content stream so as to be recognized as a two-dimensional image and display an image outside of the predetermined scene of the content stream so as to be recognized as a three-dimensional image.

14. The display controller according to claim 1, wherein the characteristic of the image data of the content stream includes a scene change.

15. The display controller according to claim 1, wherein the characteristic of the sound data of the content stream includes a silent section.

16. The display controller according to claim 1, wherein the extraction means extracts the characteristic of both the image data and the sound data of the content stream.

17. The display controller according to claim 16, wherein the characteristic of the image data of the content includes a scene change.

18. The display controller according to claim 16, wherein the characteristic of the sound data of the content includes a silent section.

19. The display controller according to claim 17, wherein the characteristic of the sound data of the content includes a silent section.

* * * * *